(12) United States Patent
Yao et al.

(10) Patent No.: US 8,017,819 B2
(45) Date of Patent: Sep. 13, 2011

(54) THERMAL TREATMENT OF TRIGLYCERIDES

(75) Inventors: Jianhua Yao, Bartlesville, OK (US); Edward L. Sughrue, II, Bartlesville, OK (US); Dhananjay B. Ghonasgi, Bartlesville, OK (US); Xiaochun Xu, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 569 days.

(21) Appl. No.: 12/109,766

(22) Filed: Apr. 25, 2008

(65) Prior Publication Data

US 2009/0266743 A1   Oct. 29, 2009

(51) Int. Cl.
*C10G 45/34* (2006.01)
(52) U.S. Cl. ............ 585/240; 44/605; 44/606; 585/733; 208/125; 208/128; 208/129; 208/295

(58) Field of Classification Search .................. 208/125, 208/128–129, 143–144, 295; 44/386, 605–606; 585/733, 240
See application file for complete search history.

(56) References Cited

U.S. PATENT DOCUMENTS

| | | | |
|---|---|---|---|
| 5,516,924 | A | 5/1996 | van de Sande et al. |
| 6,172,247 | B1 | 1/2001 | Copeland et al. |
| 7,232,935 | B2 | 6/2007 | Jakkula et al. |
| 2004/0230085 | A1* | 11/2004 | Jakkula et al. ............... 585/240 |
| 2006/0264684 | A1 | 11/2006 | Petri et al. |
| 2007/0068848 | A1 | 3/2007 | Monnier et al. |
| 2008/0161614 | A1* | 7/2008 | Bertoncini et al. ........... 585/240 |
| 2009/0288988 | A1* | 11/2009 | Mayeur et al. ................ 208/85 |

FOREIGN PATENT DOCUMENTS

WO   WO 2008/012415 A2 *   1/2008

* cited by examiner

*Primary Examiner* — Walter D Griffin
*Assistant Examiner* — Brian McCaig

(57) ABSTRACT

A triglyceride or a triglyceride/hydrocarbon combination can be heated to produce thermally treated feeds. The thermally treated feeds can then be contacted with a hydrotreating catalyst in a reaction zone.

42 Claims, No Drawings

THERMAL TREATMENT OF TRIGLYCERIDES

FIELD OF THE INVENTION

The present invention relates generally to the conversion of triglycerides to fuel range hydrocarbons.

BACKGROUND OF THE INVENTION

There is a national interest in the discovery of alternative sources of fuels and chemicals, other than from petroleum resources. As the public discussion concerning the availability of petroleum resources and the need for alternative sources continues, government mandates will require transportation fuels to include, at least in part, hydrocarbons derived from sources besides petroleum. As such, there is a need to develop alternative sources for hydrocarbons useful for producing fuels and chemicals.

One possible alternative source of hydrocarbons for producing fuels and chemicals is the natural carbon found in plants and animals, such as for example, oils and fats. These so-called "natural" carbon resources (or renewable hydrocarbons) are widely available, and remain a target alternative source for the production of hydrocarbons. For example, it is known that oils and fats, such as those contained in vegetable oil, can be processed and used as fuel. "Bio Diesel" is one such product and may be produced by subjecting a base vegetable oil to a transesterification process using methanol in order to convert the base oil to desired methyl esters. After processing, the products produced have very similar combustion properties as compared to petroleum-derived hydrocarbons. However, the use of Bio-Diesel as an alternative fuel has not yet been proven to be cost effective. In addition, Bio-Diesel often exhibits "gelling" thus making it unable to flow, which limits its use in pure form in cold climates.

Unmodified vegetable oils and fats have also been used as additives in diesel fuel to improve the qualities of the diesel fuel, such as for example, the lubricity. However, problems such as injector coking and the degradation of combustion chamber conditions have been associated with these unmodified additives. Since cetane ($C_{16}H_{34}$), heptadecane ($C_{17}H_{36}$) and octadecane ($C_{18}H_{38}$) by definition have very good ignition properties (expressed as cetane rating), it is often desired to add paraffinic hydrocarbons in the $C_{16}$-$C_{18}$ range, provided that other properties of the additive (such as for example, viscosity, pour point, cloud point, etc., are congruent with those of the diesel fuel). Processes for converting vegetable oil into hydrocarbons have been achieved, such as, for example, contacting a diesel/vegetable oil mixture with a hydrotreating catalyst. However, oftentimes, vegetable oils can contain significant amounts of metal and phosphorus compounds. These metal and phosphorus deposits can cause catalyst deactivation and plugging of the reactor catalyst bed. As such, development of a new and simple process for removing metal and phosphorus compounds from vegetable oils would be a significant contribution to the art.

SUMMARY OF THE INVENTION

In an embodiment of the present invention, a process comprising, consisting of, or consisting essentially of passing a feed comprising a hydrocarbon boiling in the temperature range of from about 25° C. to about 760° C. and a triglyceride through a heating zone, wherein the temperature in the heating zone is in the range of from about 40° C. to about 540° C.

In another embodiment of the present invention, a process comprising, consisting of, or consisting essentially of contacting a feed comprising a hydrocarbon boiling in the temperature range of from about 25° C. to about 760° C. and a triglyceride with a co-feed gas in a heating zone, wherein the temperature in the range of from about 40° C. to about 540° C.

In another embodiment of the present invention, there is a process disclosed comprising, consisting of, or consisting essentially of heating a triglyceride in a heating zone, wherein the temperature in the heating zone is in the range of from about 100° C. to about 540° C.

In another embodiment of the present invention, a process is disclosed comprising, consisting of, or consisting essentially of contacting a thermally treated feed from any one of the previous embodiments with a hydrotreating catalyst in a reaction zone under a condition sufficient to produce a reaction product containing diesel boiling range hydrocarbons, wherein the condition includes a pressure of less than about 2000 psig and a temperature in the range of from about 260° C. to about 430° C.

DETAILED DESCRIPTION OF THE INVENTION

In one embodiment of the present invention, a process comprising, consisting of, or consisting essentially of passing a feed comprising a hydrocarbon boiling in the temperature range of from about 25° C. to about 760° C. and a triglyceride through a heating zone, wherein the temperature in the heating zone is in the range of from about 40° C. to about 540° C.

In another embodiment of the present invention, a process comprising, consisting of, or consisting essentially of contacting a feed comprising a hydrocarbon boiling in the temperature range of from about 25° C. to about 760° C. and a triglyceride with a co-feed gas in a heating zone, wherein the temperature in the range of from about 40° C. to about 540° C.

Triglycerides or fatty acids of triglycerides, or mixtures thereof, may be converted to form a hydrocarbon mixture useful for liquid fuels and chemicals. The term, "triglyceride," is used generally to refer to any naturally occurring ester of a fatty acid and/or glycerol having the general formula $CH_2(OCOR_1)CH(OCOR_2)CH_2(OCOR_3)$, where $R_1$, $R_2$, and $R_3$ are the same or different, and may vary in chain length. Vegetable oils, such as for example, canola and soybean oils contain triglycerides with three fatty acid chains. Useful triglycerides in the present invention include, but are not limited to, triglycerides that may be converted to hydrocarbons when contacted under suitable reaction conditions. Examples of triglycerides useful in the present invention include, but are not limited to, vegetable oils including soybean and corn oil, peanut oil, sunflower seed oil, coconut oil, babassu oil, grape seed oil, poppy seed oil, almond oil, hazelnut oil, walnut oil, olive oil, avocado oil, sesame, oil, tall oil, cottonseed oil, palm oil, ricebran oil, canola oil, cocoa butter, shea butter, butyrospermum, wheat germ oil, illipse butter, meadowfoam, seed oil, rapeseed oil, borange seed oil, linseed oil, castor oil, vemoia oil, tung oil, jojoba oil, ongokea oil, algae oil, jatrothea oil, yellow grease (for example, as those derived from used cooking oils), and animal fats, such as poultry grease, beef fat (tallow), and milk fat, and the like and mixtures and combinations thereof.

Triglyceride starting materials may be processed alone or in combination with other hydrocarbons. The hydrocarbons generally boil at a temperature of from about 25° C. to about 760° C. Examples of suitable hydrocarbons include middle distillate fuels. Middle distillate fuels generally contain hydrocarbons that boil in the middle distillate boiling range in the range from about 150° C. to about 400° C. Typical middle distillates may include for example, jet fuel, kerosene, diesel fuel, light cycle oil, atmospheric gas oil, and vacuum gas oil. If a middle distillate feed is employed in the process of the present invention, the feed generally may contain a mixture of hydrocarbons having a boiling range (ASTM D86) of from about 150° C. to about 400° C. In addition, the middle distillate feed may have a mid-boiling point (ASTM D86) of greater than about 175° C. A middle distillate feed employed in one embodiment of the present invention is diesel fuel. In addition, one or more triglycerides can mix with a middle distillate feed.

In addition to middle distillate fuels, other suitable hydrocarbons include, but are not limited to, gasoline, naphtha, and atmospheric tower bottom.

Generally, the hydrocarbon can contain a quantity of sulfur. The amount of sulfur in the hydrocarbon can generally be greater than about 20 parts per million by weight (ppmw) sulfur. In one embodiment of the present invention, sulfur is present in an amount in the range of from about 100 ppmw to about 50,000 ppmw sulfur. In another embodiment of the present invention, sulfur is present in the range of from about 150 ppmw to 4,000 ppmw. As used herein, the term "sulfur" denotes elemental sulfur, and also any sulfur compounds normally present in a hydrocarbon stream, such as diesel fuel. Examples of sulfur compounds which may be contained in the hydrocarbon through in the present invention include, but are not limited to, hydrogen sulfide, carbonyl sulfide (COS), carbon disulfide (CS) mercaptans (RSH), organic sulfides (R—S—R), organic disulfides (R—S—S—R), thiophene, substituted thiophenes, organic trisulfides, organic tetrasulfides, benzothiophene, alkyl thiophenes, dibenzothiophene, alkyl benzothiophenes, alkyl dibenzothiophenes, and the like, and mixtures thereof as well as heavier molecular weights of the same, wherein each R can be an alkyl, cycloalkyl, or aryl group containing 1 to about 10 carbon atoms.

Generally, the triglyceride may be present in an amount in the range of from about 0.1 to about 99.9 percent, based on the total weight percent of the feed. The triglyceride can also be present in an amount in the range of from about 50 weight percent to about 99.9 weight percent based on the total weight of the mixture. The triglyceride can also be present in the feed in an amount of 100 weight percent.

In one embodiment of the present invention the temperature in the heating zone is in the range of from about 40° C. to about 540° C. In another embodiment of the present invention, the temperature in the heating zone is in the range of from about 120° C. to about 430° C., and in yet another embodiment of the present invention, the temperature in the heating zone is in the range of from about 200° C. to about 400° C.

Generally, the triglyceride contains amounts of metal compounds and phosphorus compounds. The elements that the triglyceride contains are generally selected from the group consisting of phosphorus, alkali metals, alkaline earth metals and combinations thereof. The amounts of these compounds are generally in the range of from about 0 ppmw to about 10,000 ppmw.

The degumming of triglycerides involves contacting the triglycerides with a water wash. In the present invention, the triglycerides can either be degummed or not degummed prior to being heated in the heating zone.

In one embodiment of the present invention, the feed is contacted with a co-feed gas in the heating zone. Generally, the co-feed gas is selected from the group consisting of hydrogen, nitrogen, helium, carbon monoxide, and carbon dioxide. In one embodiment, the co-feed gas can be hydrogen or nitrogen.

Another embodiment of the present invention comprises, consists of, or consists essentially of heating a triglyceride in a heating zone, wherein the temperature in the heating zone is in the range of from about 100° C. to about 540° C.

The temperature in the heating zone is generally in the range of from about 100° C. to about 540° C. The temperature in the heating zone can also be in the range of from about 120° C. to about 430° C., and the temperature in the heating zone can also be in the range of from about 200° C. to about 400° C.

The triglyceride generally contains amounts of metal compounds and phosphorus compounds, as in the previous embodiments. The elements that the triglyceride contains are generally selected from the group consisting of phosphorus, alkali metals, alkaline earth metals and combinations thereof. The amounts of these compounds are generally in the range of from about 0 ppmw to about 10,000 ppmw, as in the previous embodiments.

The triglycerides can also either be degummed or not degummed prior to being heated in the heating zone, as in the previous embodiments.

As in the previous embodiments, the triglyceride can be contacted with a co-feed gas in the heating zone. Generally, the co-feed gas is selected from the group consisting of hydrogen, nitrogen, helium, carbon monoxide, and carbon dioxide. In one embodiment, the co-feed gas can be hydrogen or nitrogen.

An embodiment of the present invention is a process comprising, consisting of, or consisting essentially of: contacting a thermally treated feed from any one of the previous embodiments with a hydrotreating catalyst in a reaction zone under a condition sufficient to produce a reaction product containing diesel boiling range hydrocarbons, wherein the condition includes a pressure of less than about 2000 psig and a temperature in the range of from about 260° C. to about 430° C.

Generally, a thermally treated feed from any one of the previous embodiments can be contacted with a catalyst composition under a condition sufficient to produce a reaction product containing diesel boiling range hydrocarbons. Useful catalyst compositions in the present invention include catalysts effective in the conversion of triglycerides to hydrocarbons when contacted under suitable reaction conditions. Examples of suitable catalysts include hydrotreating catalysts. The term "hydrotreating" as used herein, generally describes a catalyst that is capable of utilizing hydrogen to accomplish saturation of unsaturated materials, such as aromatic compounds. Examples of hydrotreating catalysts useful in the present invention include, but are not limited to, materials containing compounds selected from Group VI and Group VIII metals, and their oxides and sulfides. Examples of hydrotreating catalysts include but are not limited to alumina supported cobalt-molybdenum, nickel sulfide, nickel-tungsten, cobalt-tungsten and nickel-molybdenum.

The metal of the catalyst useful in the present invention is usually distributed over the surface of a support in a manner than maximizes the surface area of the metal. Examples of suitable support materials for the hydrogenation catalysts include, but are not limited to, silica, silica-alumina, aluminum oxide ($Al_2O_3$), silica-magnesia, silica-titania and acidic zeolites of natural or synthetic origin. The metal catalyst may be prepared by any method known in the art, including combining the metal with the support using conventional means including but not limited to impregnation, ion exchange and vapor deposition. In an embodiment of the present invention, the catalyst contains molybdenum and cobalt supported on alumina or molybdenum and nickel supported on alumina.

This process in accordance with an embodiment of the present invention can be carried out in any suitable reaction zone that enables intimate contact of the thermally treated feed and control of the operating conditions under a set of reaction conditions that include total pressure, temperature, liquid hourly space velocity, and hydrogen flow rate. The catalyst can be added first to the reactants and thereafter, fed with hydrogen. If desired, the thermally treated feed can pass through a filter before passing to the reaction zone. In the present invention, either fixed bed reactors or fluidized bed reactors can be used. As used herein, the term "fluidized bed reactor" denotes a reactor wherein a fluid feed can be contacted with solid particles in a manner such that the solid particles are at least partly suspended within the reaction zone by the flow of the fluid feed through the reaction zone and the solid particles are substantially free to move about within the reaction zone as driven by the flow of the fluid feed through the reaction zone. As used herein, the term "fluid" denotes gas, liquid, vapor and combinations thereof.

Generally, the reaction conditions at which the reaction zone is maintained generally include a temperature in the range of from about 260° C. to about 430° C. Preferably, the temperature is in the range of from about 310° C. to about 370° C.

In accordance with the present invention, regardless of whether a fixed or fluidized bed reactor is used, the pressure is generally in the range of from about 100 pounds per square inch gauge (psig) to about 2000 psig. Generally, in a fixed bed reactor, the pressure is in the range of from about 100 psig to about 1500 psig. In a fixed bed reactor, the pressure can also be about 600 psig. In a fluidized bed reactor, the pressure is generally in the range of from about 400 psig to about 750 psig, and can also be about 500 psig.

The following examples are presented to further illustrate the present invention and are not to be construed as unduly limiting the scope of this invention.

EXAMPLE 1

Undegummed vegetable oil was diluted in an undesulfurized diesel fuel to provide a mixture containing 10% vegetable oil. The mixture was mixed with either hydrogen or nitrogen and was fed into a heated ¼-inch diameter tube. The feed was exposed to a temperature of 348° C. for about 20 seconds. One run was done with hydrogen as a co-feed, and another with nitrogen as a co-feed. The feed and product metal concentrations are shown in Table I, below.

TABLE I

Thermal Treatment of Vegetable Oil

| Description | Feed | Product 1 | Product 2 |
| --- | --- | --- | --- |
| Treatment Temperature, ° C. | | 348 | 348 |
| Treatment Pressure, psig | | 200 | 200 |
| Co-feed Gas | | $H_2$ | $N_2$ |
| ICP metal, ppm | | | |
| Potassium | 18.9 | 1.6 | 1.6 |
| Calcium | 7.6 | 1.0 | 1.0 |
| Magnesium | 7.4 | 0.9 | 1.1 |
| Phosphorus | 47.6 | 10.5 | 13.6 |
| Total | 81.5 | 14.1 | 17.3 |

The total metals and phosphorus removal is about 80%.

EXAMPLE 2

A mixture of soybean oil and diesel was fed into a heated tube operated at a temperature of about 330° C. and a pressure of 700 psig (there was no co-feed gas present). The mixture was then passed through a filter and sent to a hydrotreating reactor containing a hydrotreating catalyst. Table 2 below shows that the hydrotreating reactor experienced no pressure drop, unlike when the same mixture is fed through a hydrotreating reactor without the pre-treatment.

TABLE 2

| Reactor Configuration | Hydrotreating Reactor Only | Heated Tube/Filter/Hydrotreating Reactor |
| --- | --- | --- |
| Time On-Stream, hrs | 50 | 100 |
| Reactor Pressure Drop, psig | 100 | none |

While this invention has been described in detail for the purpose of illustration, it should not be construed as limited thereby but intended to cover all changes and modifications within the spirit and scope thereof.

That which is claimed:

1. A process comprising:
   contacting a feed comprising a hydrocarbon boiling in the temperature range of from about 25° C. to about 760° C. and a triglyceride with a co-feed gas in a heating zone, and obtaining a thermally treated triglyceride containing feed,
   wherein the temperature in said heating zone is in the range of from about 40° C. to about 540° C.; and wherein said co-feed gas is an inert gas.

2. A process in accordance with claim 1 wherein said triglyceride is present in said feed in an amount in the range of from about 0.01 to about 100 weight percent based on the total weight of said feed.

3. The process in accordance with claim 1, wherein said triglyceride is selected from the group consisting of vegetable oil, soybean oil, yellow grease, animal fats and mixtures thereof.

4. The process in accordance with claim 3, wherein said triglyceride is vegetable oil.

5. The process in accordance with claim 3, wherein said triglyceride is soybean oil.

6. The process in accordance with claim 1 wherein said contacting temperature is in the range of from about 120° C. to about 430° C.

7. The process in accordance with claim 1 wherein said contacting temperature is in the range of from about 200° C. to about 400° C.

8. The process in accordance with claim 1 wherein said feed further comprises elements selected from the group consisting of phosphorus, alkali metals, alkaline earth metals, and combinations thereof.

9. The process in accordance with claim 1 wherein said triglyceride is not degummed prior to contacting with said co-feed gas.

10. The process in accordance with claim 1 wherein said inert gas is nitrogen or helium.

11. A process comprising:
   a) contacting a feed comprising a hydrocarbon boiling in the temperature range of from about 25° C. to about 760° C. and a triglyceride with a co-feed gas in a heating zone, to form a thermally treated triglyceride containing feed; wherein the temperature in said heating zone is in the range of from about 40° C. to about 540° C.; and wherein said co-feed gas is an inert gas; and
   b) contacting said thermally treated feed with a hydrotreating catalyst in a reaction zone under a condition sufficient to produce a reaction product containing diesel boiling range hydrocarbons, wherein the condition includes a pressure of less than about 2000 psig and a temperature in the range of from about 260° C. to about 430° C.

12. The process in accordance with claim 11 wherein said triglyceride is present in said feed in an amount in the range of from about 0.01 to about 100 weight percent based on the total weight of said feed.

13. The process in accordance with claim 11, wherein said triglyceride is selected from the group consisting of vegetable oil, soybean oil, yellow grease, animal fats and mixtures thereof.

14. The process in accordance with claim 13, wherein said triglyceride is vegetable oil.

15. The process in accordance with claim 13, wherein said triglyceride is soybean oil.

16. The process of claim 11, wherein said hydrocarbon is selected from the group consisting of gasoline, naphtha, jet fuel, kerosene, diesel fuel, light cycle oil, vacuum gas oil, atmospheric gas oil, atmospheric tower bottom, and combinations of any two or more thereof.

17. The process of claim 16, wherein said hydrocarbon is diesel fuel.

18. The process of claim 11, wherein said hydrotreating catalyst comprises nickel and molybdenum.

19. The process of claim 11, wherein said hydrotreating catalyst comprises cobalt and molybdenum.

20. The process in accordance with claim 11 wherein said temperature in said heating zone in step (a) is in the range of from about 120° C. to about 430° C.

21. The process in accordance with claim 11 wherein said temperature in said heating zone in step (a) is in the range of from about 200° C. to about 400° C.

22. The process in accordance with claim 11 wherein said feed further comprises metal selected from the group consisting of phosphorus, alkali metals, alkaline earth metals, and combinations thereof.

23. The process in accordance with claim 11 wherein said triglyceride is not degummed prior to said heating in step (a).

24. The process in accordance with claim 11 wherein said inert gas is nitrogen or helium.

25. A process comprising heating a triglyceride with a co-feed gas in a heating zone, and obtaining a thermally treated triglyceride containing feed wherein the temperature in said heating zone is in the range of from about 100° C. to about 540° C.; and wherein said co-feed gas is an inert gas.

26. The process in accordance with claim 25 wherein said temperature in said heating zone is in the range of from about 120° C. to about 430° C.

27. The process in accordance with claim 25 wherein said temperature in said heating zone is in the range of from about 200° C. to about 400° C.

28. The process in accordance with claim 25, wherein said triglyceride is selected from the group consisting of vegetable oil, soybean oil, yellow grease, animal fats and mixtures thereof.

29. The process in accordance with claim 25, wherein said triglyceride is vegetable oil.

30. The process in accordance with claim 25, wherein said triglyceride is soybean oil.

31. The process in accordance with claim 25, wherein said inert gas is nitrogen or helium.

32. The process in accordance with claim 25 wherein said triglyceride is not degummed prior to said heating.

33. A process comprising:
  a) heating a triglyceride with a co-feed gas in a heating zone to form a thermally treated triglyceride containing feed; wherein the temperature in said heating zone is in the range of from about 100° C. to about 540° C. and wherein said co-feed gas is an inert gas; and
  b) contacting said thermally treated feed with a hydrotreating catalyst in a reaction zone under a condition sufficient to produce a reaction product containing diesel boiling range hydrocarbons, wherein the condition includes a pressure of less than about 2000 psig and a temperature in the range of from about 260° C. to about 430° C.

34. The process in accordance with claim 33, wherein said triglyceride is selected from the group consisting of vegetable oil, soybean oil, yellow grease, animal fats and mixtures thereof.

35. The process in accordance with claim 34, wherein said triglyceride is vegetable oil.

36. The process in accordance with claim 34, wherein said triglyceride is soybean oil.

37. The process of claim 33, wherein said hydrotreating catalyst comprises nickel and molybdenum.

38. The process of claim 33, wherein said hydrotreating catalyst comprises cobalt and molybdenum.

39. The process in accordance with claim 33 wherein said temperature in said heating zone in step (a) is in the range of from about 120° C. to about 430° C.

40. The process in accordance with claim 33 wherein said temperature in said heating zone in step (a) is in the range of from about 200° C. to about 400° C.

41. The process in accordance with claim 33 wherein said triglyceride further comprises metal selected from the group consisting of phosphorus, alkali metals, alkaline earth metals, and combinations thereof.

42. The process in accordance with claim 33 wherein said triglyceride is not degummed prior to said heating in step (a).

* * * * *